(12) United States Patent
Baskin

(10) Patent No.: US 11,015,652 B2
(45) Date of Patent: May 25, 2021

(54) HYBRID ELASTOMERIC SELF-LUBRICATED BEARING

(71) Applicant: Lockheed Martin Corporation, Bethesda, MD (US)

(72) Inventor: Bryan Kenneth Baskin, Arlington, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 97 days.

(21) Appl. No.: 16/253,004

(22) Filed: Jan. 21, 2019

(65) Prior Publication Data

US 2020/0232512 A1  Jul. 23, 2020

(51) Int. Cl.
  *F16C 33/66* (2006.01)
  *B64C 27/35* (2006.01)
  *F16C 19/06* (2006.01)

(52) U.S. Cl.
  CPC .......... *F16C 33/6659* (2013.01); *B64C 27/35* (2013.01); *F16C 19/06* (2013.01); *F16C 2326/43* (2013.01)

(58) Field of Classification Search
  None
  See application file for complete search history.

(56) References Cited

U.S. PATENT DOCUMENTS

| | | | |
|---|---|---|---|
| 9,011,010 B2 | 4/2015 | Mueller et al. | |
| 9,316,257 B2* | 4/2016 | Harper | F16C 33/74 |
| 9,327,832 B2 | 5/2016 | Sottiaux et al. | |
| 9,616,996 B2 | 4/2017 | Schmaling et al. | |
| 9,709,089 B2 | 7/2017 | Bohm | |
| 9,951,808 B2 | 4/2018 | Romano et al. | |
| 10,330,148 B2* | 6/2019 | Buesing | F16C 27/063 |
| 2012/0257847 A1* | 10/2012 | Allred | F16C 27/06 |
| | | | 384/221 |
| 2015/0240868 A1* | 8/2015 | Buesing | F16C 29/02 |
| | | | 416/134 A |
| 2017/0297691 A1 | 10/2017 | Nussenblatt et al. | |

* cited by examiner

*Primary Examiner* — David Hamaoui
*Assistant Examiner* — Jason Fountain
(74) *Attorney, Agent, or Firm* — Foley & Lardner LLP

(57) ABSTRACT

A hybrid bearing system includes a self-lubricated bearing assembly including a self-lubricated bearing element and at least one elastomeric bearing assembly arranged adjacent the self-lubricated bearing assembly. The elastomeric bearing assembly is torsionally mated with the self-lubricated bearing element as a torsional load is applied about an axis of the self-lubricated bearing.

20 Claims, 2 Drawing Sheets

HYBRID ELASTOMERIC SELF-LUBRICATED BEARING

BACKGROUND

Embodiments of the present disclosure relate to bearings for use in aerospace applications, and more particularly, to bearings suitable for use in a rotor system of a helicopter.

Bearings that allow rotation and misalignment are commonly used in flight control systems of aircraft applications. As the technology used in modern aircraft has improved, the bearings used in these flight control systems encounter different types of motions. In particular, the systems may encounter large types of motions as a result of a control input provided by the pilot.

Many types and styles of bearings have been used in these flight control applications with marginal results normally resulting in premature removal of the bearing from aircraft service and increased maintenance costs, which in turn increase the operating cost of the aircraft. Two types of bearing systems commonly used in aircraft applications include self-lubricated bearings and elastomeric bearings. Self-lubricated bearings are designed to wear throughout their operational life. Accordingly, the life of a self-lubricated bearing depends on the application and the amount of wear that accumulates during use. In addition, self-lubricated bearings have an operational pressure limit associated with a sliding velocity of the bearing.

Elastomeric bearings typically include alternating layers of elastomeric material and metallic or composite shims. Elastomeric bearings may be used in place of self-lubricated bearings in aerospace applications. However, cold temperatures may affect the spring rate of the elastomeric material, thereby reducing the service life and static strength of the bearings. An increased spring rate may also result in dynamic behavior alteration of systems which utilize the elastomeric bearings.

BRIEF DESCRIPTION

According to an embodiment, a hybrid bearing system includes a self-lubricated bearing assembly including a self-lubricated bearing element and at least one elastomeric bearing assembly arranged adjacent the self-lubricated bearing assembly. The elastomeric bearing assembly is torsionally mated with the self-lubricated bearing element as a torsional load is applied about an axis of the self-lubricated bearing.

In addition to one or more of the features described above, or as an alternative, in further embodiments the at least one elastomeric bearing assembly includes a first elastomeric bearing assembly arranged adjacent a first side of the self-lubricated bearing assembly and a second elastomeric bearing assembly arranged adjacent a second, opposite side of the self-lubricated bearing assembly.

In addition to one or more of the features described above, or as an alternative, in further embodiments a configuration of the first elastomeric bearing assembly and the second elastomeric bearing assembly is substantially identical.

In addition to one or more of the features described above, or as an alternative, in further embodiments the first elastomeric bearing assembly has a first configuration and the second elastomeric bearing assembly has a second configuration distinct from the first configuration.

In addition to one or more of the features described above, or as an alternative, in further embodiments the self-lubricating bearing assembly further comprises an inner race and an outer race. The self-lubricated bearing element is movably mounted between the inner race and the outer race and the elastomeric bearing assembly is torsionally mated with the self-lubricated bearing element such that a motion resulting from the torsional load is divided generally equally between an interface between the self-lubricated bearing element and the inner race and another interface between the self-lubricated bearing element and the outer race.

In addition to one or more of the features described above, or as an alternative, in further embodiments the at least one elastomeric bearing assembly further comprises at least one shim and at least one elastomeric member having a selected spring rate, the at least one elastomeric bearing member being compressible at the selected spring rate in response to the torsional load.

In addition to one or more of the features described above, or as an alternative, in further embodiments the at least one shim includes an inner shim, and outer shim, and an intermediate shim disposed radially between the inner shim and the outer shim, and the at least one elastomeric member includes a first elastomeric member positioned between the inner shim and the intermediate shim, and a second elastomeric member positioned between the intermediate shim and the outer shim.

In addition to one or more of the features described above, or as an alternative, in further embodiments the selected spring rate of the first elastomeric member is equal to the selected spring rate of the second elastomeric member.

In addition to one or more of the features described above, or as an alternative, in further embodiments the selected spring rate of the first elastomeric member is different than the selected spring rate of the second elastomeric member.

In addition to one or more of the features described above, or as an alternative, in further embodiments the intermediate shim is in direct contact with the self-lubricated bearing element.

In addition to one or more of the features described above, or as an alternative, in further embodiments when a torsional load is applied to the hybrid bearing, the inner shim is operable to torsionally couple to the inner race, and the outer shim is operable to torsionally couple to the outer race.

In addition to one or more of the features described above, or as an alternative, in further embodiments the self-lubricated bearing element is a single ball.

In addition to one or more of the features described above, or as an alternative, in further embodiments the self-lubricated bearing element includes a plurality of bearing elements.

In addition to one or more of the features described above, or as an alternative, in further embodiments at least one engagement surface of the self-lubricated bearing has a non-planar configuration.

In addition to one or more of the features described above, or as an alternative, in further embodiments the hybrid bearing has monitoring technology embedded therein.

In addition to one or more of the features described above, or as an alternative, in further embodiments the monitoring technology includes at least one sensor operable to measure a parameter of the hybrid bearing indicative of a health of the hybrid bearing.

In addition to one or more of the features described above, or as an alternative, in further embodiments the at least one elastomeric bearing assembly seal and adjacent side of the self-lubricated bearing assembly.

In addition to one or more of the features described above, or as an alternative, in further embodiments an aircraft is provided comprising the hybrid bearing system disposed between a first member and a second member of the aircraft, the first member being rotatable about the axis relative to the second member.

In addition to one or more of the features described above, or as an alternative, in further embodiments the hybrid bearing is mounted in a rotor system of the aircraft.

In addition to one or more of the features described above, or as an alternative, in further embodiments the first member is a rotor hub and the second member is a rotor blade assembly.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
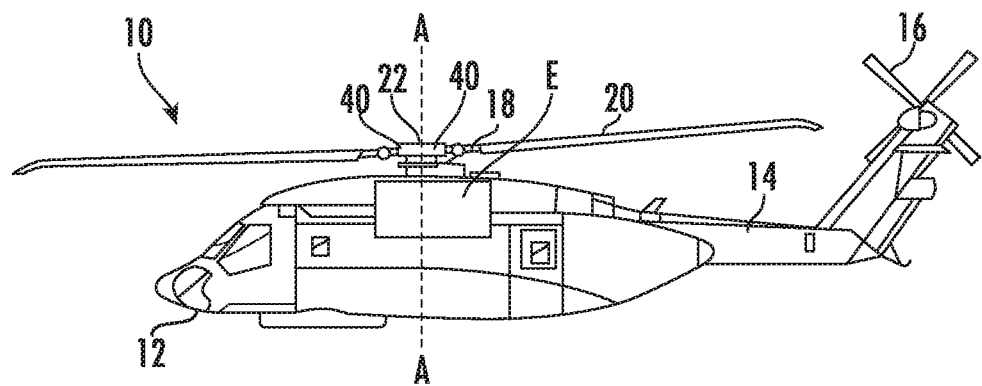
FIG. 1 is a side view of an example of a rotary wing aircraft.

With reference now to FIG. 1, an example of an aircraft 10 is illustrated. As shown, the rotary wing aircraft 10 is a helicopter and includes an airframe 12 having an extending tail 14 which mounts a tail rotor system 16, such as an anti-torque system. A main rotor system 18 of the rotary wing aircraft is driven about an axis of rotation A through a main power transmission gearbox (not shown) by one or more engines E. The main rotor system 18 includes a plurality of rotor blade assemblies 20 mounted to a rotor hub 22.

Figure 2:
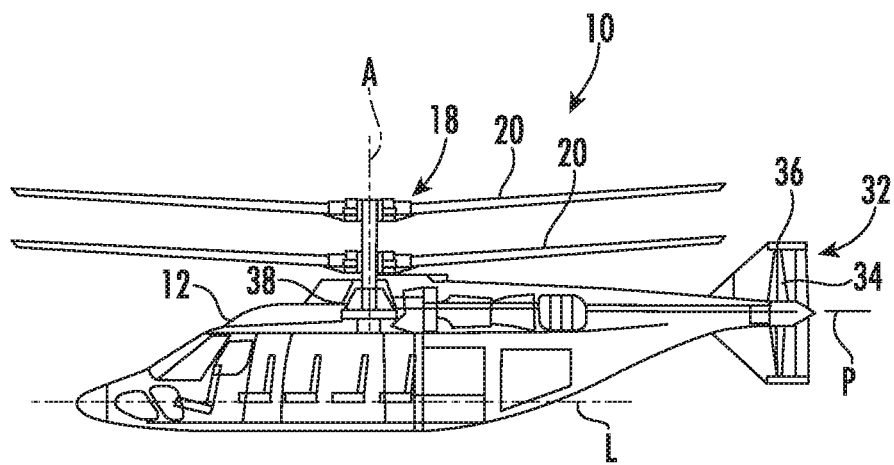
FIG. 2 is a cross-sectional view of another example of a rotary wing aircraft.

With reference to FIG. 2, another example of a rotary wing aircraft 10 is illustrated. As shown, the aircraft 10 includes an airframe 12 which supports a dual, contra-rotating, coaxial main rotor system 18. The main rotor system 18 includes a first rotor system 24 and a second rotor system 26, each of which includes a plurality of rotor blades 20 mounted to a rotor hub 28, 30. A tail 14 of the airframe 12 supports a translational thrust system 32 which provides translational thrust generally parallel to an aircraft longitudinal axis L. Further, the translational thrust system 32 may be any propeller system including, but not limited to a pusher propeller, a tractor propeller, a nacelle mounted propeller, etc. In the illustrated, non-limiting embodiment, the translational thrust system 32 includes a pusher propeller system 34 as illustrated with a propeller rotational axis P oriented substantially horizontal and parallel to the aircraft longitudinal axis L to provide thrust for high-speed flight. The illustrated embodiment mounts the propeller system within an aerodynamic cowling 36 at the rear of the airframe 12. The translational thrust system 32 is typically driven through a main gearbox 38 which additionally drive the rotor system 18.

Although particular helicopter configurations are illustrated and described in the disclosed embodiment, other configurations and/or machines, such as ground vehicles, jet aircraft, turbofan engines, high speed compound rotary wing aircraft with supplemental translational thrust systems, quad-copter, multi-rotor lifting bodies, turbo-props, tilt-rotors and tilt-wing aircraft, and the like may also benefit from the embodiments described herein. Aircraft 10 may be a piloted (e.g., a manned aircraft), an unmanned aerial vehicle, optionally piloted vehicle, etc.

Referring again to FIG. 1, in the illustrated, non-limiting embodiment, the rotor blade assemblies 20 are rotatably connected to the airframe 12, directly or indirectly, by one or more hybrid bearings 40. However, a person having ordinary skill in the art will appreciate that the hybrid bearings 40 illustrated and described herein with respect to the main rotor system 18 may be used at other positions throughout the rotary wing aircraft 10, or in other non-aircraft applications.

Figure 3:
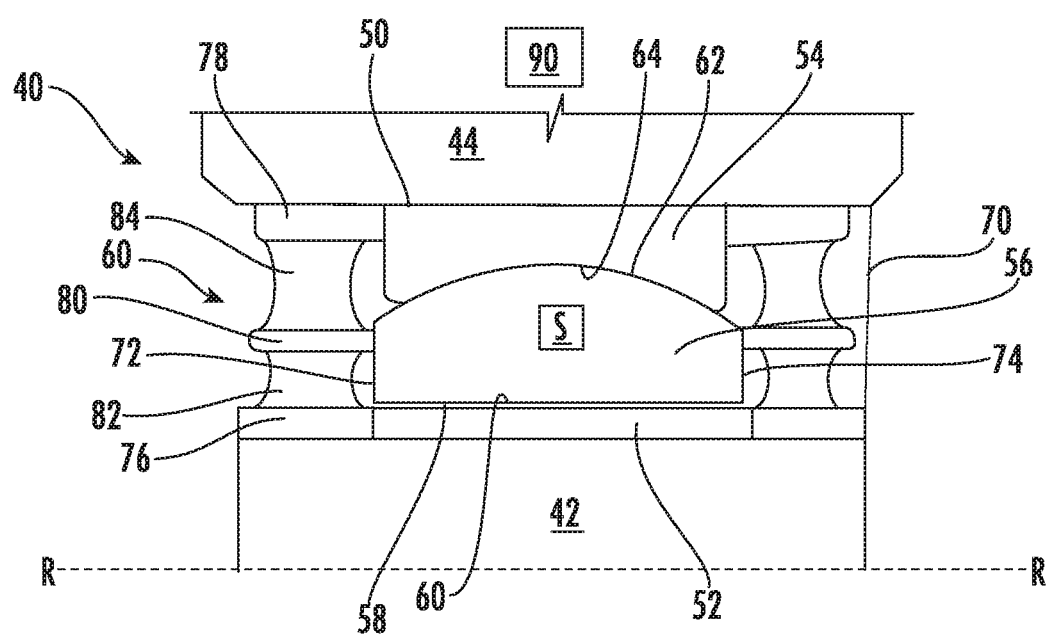
FIG. 3 is a cross-sectional view of a hybrid bearing of a main rotor system of a rotary wing aircraft according to an embodiment.

With reference now to FIG. 3, a cross-sectional view of a portion of a hybrid bearing 40 is illustrated in more detail. As shown, the hybrid bearing 40 is disposed between an inner member 42, such as a portion of the rotor hub 22 for example, and an outer member 44, such as a portion of a rotor blade assembly 20, e.g. a blade cuff for example. In the illustrated, non-limiting embodiment, the outer member 44 is rotatable about a pitch axis R, and the hybrid bearing 40 may be used to allow for relative rotational motion about the axis R between the inner member 42 and the outer member 44. In the example in FIG. 1, the axis R for each rotor blade assembly 20 would rotate the rotor blade assembly 20 to change the blade pitch angle between the chord line of the rotor blade assembly 20 and the rotor hub 22.

The hybrid bearing 40 includes a self-lubricated bearing assembly 50 and at least one elastomeric bearing assembly 70. As shown in the FIG. 2, the self-lubricated bearing assembly 50 is disposed at a center of the hybrid bearing 40. The self-lubricated bearing assembly 50 includes an inner race 52, and outer race 54, and at least one bearing element 56 disposed between the inner and outer races 52, 54. The self-lubricated bearing assembly 50 is mounted concentrically between the inner member 42 and outer member 44 such that the inner race 52 is in direct contact with the inner member 42 and the outer race 54 is in direct contact with the outer member 44. However, embodiments, wherein a liner or other component (not shown) is positioned between at the interface between the self-lubricated bearing assembly 50 and the inner and outer members 42, 44, are also contemplated herein.

The at least one bearing element 56 includes an inner surface 58 configured to contact a sliding surface 60 of the inner race 52, and an outer surface 62 configured to engage a sliding surface 64 of the outer race 54. Accordingly, a contour of the inner surface 58 of the at least one bearing element 56 may be complementary to the adjacent sliding surface 60 of the inner race 52 and/or the contour of the outer surface 62 of the at least one bearing element 56 may be complementary to the adjacent sliding surface 64 of the outer race 54. In the illustrated, non-limiting embodiment, the at least one bearing element 56 includes a single ball. As shown, the inner surface 58 of the at least one bearing element 56 and the sliding surface 60 of the inner race 52 are generally cylindrical. Similarly, the outer surface 62 of the at least one bearing element 56 has a convex contour and the corresponding sliding surface 64 of the outer race 54 has a concave contour. However, embodiments where the at least one bearing element 56 is a single element having a different shape, as well as embodiments where the at least one bearing element 56 includes a plurality of bearing elements are also within the scope of the disclosure.

The at least one elastomeric bearing assembly 70 of the hybrid bearing 40 similarly extends between the inner member 42 and the outer member 44, and is arranged adjacent a side of the self-lubricated bearing assembly 50. In the illustrated, non-limiting embodiment, the hybrid bearing 40 includes a first elastomeric bearing assembly 70 adjacent a first side 72 of the self-lubricated bearing assembly 40, and a second elastomeric bearing assembly 70 adjacent a second, opposite side 74 of the self-lubricated bearing assembly 50. The configuration of the first elastomeric bearing assembly 70 and the second elastomeric bearing assembly 70 may be substantially identical, or alternatively, may vary. Each elastomeric bearing assembly 70 is operable to form a seal adjacent a respective side 72, 74 of the self-lubricated bearing assembly 50 from dust, dirt, and other debris.

Each elastomeric bearing assembly 70 includes at least one elastomeric member and at least one shim. In the illustrated, non-limiting embodiment, each elastomeric bearing assembly 70 includes an inner shim 76 arranged in contact with the inner member 42, an outer shim 78, arranged in contact with the outer member 44, and an intermediate shim 80 located at some position between the inner and outer shims 76, 78. The shims may be formed from any suitable metal material, such as steel, titanium, or aluminum, or a composite material such as graphite/epoxy. A first elastomeric member 82 is located between the inner shim 76 and the intermediate shim 80, and a second elastomeric member 84 is located between the intermediate shim 80 and the outer shim 78. In an embodiment, the first elastomeric member 82 and the second elastomeric member 84 are substantially identical in size, shape, and stiffness or spring rate. However, in other embodiments, the configurations of the first elastomeric member 82 and the second elastomeric member 84 may vary. The configuration of the elastomeric bearing assembly 70 illustrated and described herein is intended as an example only, and it should be understood that embodiments including additional shims and/or elastomeric members are also within the scope of the disclosure.

Each of the plurality of shims 76, 78, 80 of the elastomeric bearing assembly 60 is sized and positioned such that the shims 76, 78, and 80, are directly adjacent to, and in contact with, a portion of the self-lubricated bearing assembly 50. As a result, each of the shims 76, 78, and 80 is configured to mate with the adjacent portion of the bearing assembly 50 when a torsional force is applied to the hybrid bearing 40. For example, the inner shim 76 is configured to torsionally mate with the adjacent inner race 52, the outer shim 78 is configured to torsionally mate with the adjacent outer race 54, and the intermediate shim 80 is configured to torsionally mate with the at least one bearing element 56 as the outer member 44 rotates about the axis R.

By incorporating elastomeric members 82, 84 having a defined spring rate, the hybrid bearing 40 is configured to move in a predictable manner. More specifically, the compressive strain in elastomeric members 82, 84 is limited by the stiffer compressive load path through the self-lubricated bearing assembly 50. The elastomeric members 82, 84 are configured to function like torsional springs that shear when a torsional load is applied to the hybrid bearing 40 and are optimized for this purpose since they are not the primary compression load path. Via the spring rate of the elastomeric members 82, 84, the compressive stiffness of the hybrid bearing 40 is prevented from being zero when there is clearance in the self-lubricated bearing assembly 50, either due to design intent or wear. As the elastomeric members 82, 84 shear, each of the shims 76, 78, 80 of the elastomeric bearing assembly 70 torsionally mates with the adjacent portion of the self-lubricated bearing assembly 50. As used herein the term "torsionally mated" includes a frictional connection formed between the adjacent components as either the first member 42 or second member 44 is rotated about the axis R. Alternatively, the term torsionally mated may include embodiments where adjacent components are mechanically fastened and/or chemically fastened, such as with an adhesive for example. As a result of this compression, the portions of the self-lubricated bearing assembly 50 torsionally mated with the shims 76, 78, 80 of the elastomeric bearing assembly 70 slide evenly relative to each other. More specifically, the motion resulting from the torsional load is divided generally equally between the at least one bearing element 56 and the inner race 52 and outer race 54, respectively.

Because the hybrid bearing 40 is sealed, the hybrid bearing 40 may have monitoring technology embedded therein. The monitoring technology may include one or more sensors, illustrated schematically at S, embedded within one or more of the self-lubricating bearing assembly 50, the at least one elastomeric bearing assembly 70, an interface between the self-lubricating bearing assembly 50 and the at least one elastomeric bearing assembly 70, and an interface between the hybrid bearing 40 and one of the adjacent inner and outer members 42, 44. The sensor(s) S may be operable to measure any of a variety of parameters indicative of a health of the various portions of the hybrid bearing 40, such as stress, strain, or deflection for example. The sensor(s) S may be configured to communicate with a processing device, illustrated at 90, where processing of the sensor signals is performed to evaluate a health of the hybrid bearing 40. In an embodiment, the processing device 90 is part of a health usage and monitoring system (HUMS) of an aircraft 10. However, in other embodiments, the processing device 90 may be part of a flight control system, such as a flight control computer for example, or may be a separate therefrom.

By dividing the motion across multiple interfaces of the self-lubricating bearing assembly 50, the sliding travel at each interface is reduced. As a result, the life of the self-lubricated bearing assembly 50 may be extended such that the life of the hybrid bearing 40 is greater than conventional bearing assemblies. In addition, the overall size of the bearing 40 may be reduced and the load capacity of the hybrid bearing 40 may be increased relative to existing bearings as the sliding velocity is decreased.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid bearing system comprising:
   a self-lubricated bearing assembly including a self-lubricated bearing element; and
   at least one elastomeric bearing assembly arranged adjacent the self-lubricated bearing assembly, the at least one elastomeric bearing assembly being torsionally mated with the self-lubricated bearing element as a torsional load is applied about an axis of the self-lubricated bearing;
   wherein the self-lubricating bearing assembly further comprises:
      an inner race; and
      an outer race, the self-lubricated bearing element being movably mounted between the inner race and the outer race, and the at least one elastomeric bearing assembly being torsionally mated with the self-lubricated bearing element such that a motion resulting from the torsional load is divided between an interface between the self-lubricated bearing element and the inner race and another interface between the self-lubricated bearing element and the outer race;
   wherein the self-lubricated bearing element is stiffer than the at least one elastomeric bearing assembly; the at least one elastomeric bearing assembly is located at a distance from a primary compressive load path that goes through the self-lubricated bearing assembly; and the primary compressive load path that goes through the self-lubricated bearing assembly does not go through the at least one elastomeric bearing assembly.

2. The hybrid bearing system of claim 1, wherein the at least one elastomeric bearing assembly includes a first elastomeric bearing assembly arranged adjacent a first side of the self-lubricated bearing assembly and a second elastomeric bearing assembly arranged adjacent a second, opposite side of the self-lubricated bearing assembly.

3. The hybrid bearing system of claim 2, wherein the first elastomeric bearing assembly and the second elastomeric bearing assembly are identical.

4. The hybrid bearing system of claim 2, wherein the first elastomeric bearing assembly differs from the second elastomeric bearing assembly.

5. The hybrid bearing system of claim 1, wherein the motion resulting from the torsional load is divided generally equally between the interface between the self-lubricated bearing element and the inner race and the another interface.

6. The hybrid bearing system of claim 1, wherein the at least one elastomeric bearing assembly further comprises at least one shim and at least one elastomeric bearing member having a selected spring rate, the at least one elastomeric bearing member being compressible at the selected spring rate in response to the torsional load.

7. The hybrid bearing system of claim 6, wherein the at least one shim includes an inner shim, an outer shim, and an intermediate shim disposed radially between the inner shim and the outer shim, and the at least one elastomeric bearing member includes a first elastomeric member positioned between the inner shim and the intermediate shim, and a second elastomeric member positioned between the intermediate shim and the outer shim.

8. The hybrid bearing system of claim 7, wherein the selected spring rate of the first elastomeric member is equal to the selected spring rate of the second elastomeric member.

9. The hybrid bearing system of claim 7, wherein the selected spring rate of the first elastomeric member is different than the selected spring rate of the second elastomeric member.

10. The hybrid bearing system of claim 7, wherein the intermediate shim is in direct contact with the self-lubricated bearing element.

11. The hybrid bearing system of claim 7, wherein when a torsional load is applied to the hybrid bearing, the inner shim is operable to torsionally couple to the inner race, and the outer shim is operable to torsionally couple to the outer race.

12. The hybrid bearing system of claim 1, wherein the self-lubricated bearing element is a single ball.

13. The hybrid bearing system of claim 1, wherein the self-lubricated bearing element includes a plurality of bearing elements.

14. The hybrid bearing system of claim 1, wherein at least one engagement surface of the self-lubricated bearing has a non-planar configuration.

15. The hybrid bearing system of claim 1, wherein the hybrid bearing system has monitoring technology embedded therein.

16. The hybrid bearing system of claim 15, wherein the monitoring technology includes at least one sensor operable to measure a parameter of the hybrid bearing system indicative of a health of the hybrid bearing.

17. The hybrid bearing system of claim 1, wherein the first elastomeric bearing assembly forms a first seal adjacent to the first side of the self-lubricated bearing assembly and the second elastomeric bearing assembly forms a second seal adjacent to the second side of the self-lubricated bearing assembly.

18. An aircraft comprising the hybrid bearing system of claim 1 disposed between a first member and a second member of the aircraft, the first member being rotatable about the axis relative to the second member.

19. The aircraft of claim 18, wherein the hybrid bearing is mounted in a rotor system of the aircraft.

20. The aircraft of claim 19, wherein the first member is a rotor hub and the second member is a rotor blade assembly.

* * * * *